(12) United States Patent
Lohden et al.

(10) Patent No.: US 6,566,441 B1
(45) Date of Patent: May 20, 2003

(54) POLY(METH)ACRYLATE PLASTISOLS AND PROCESS FOR THE PRODUCTION THEREOF

(75) Inventors: Gerd Lohden, Hanau (DE); Mauren Trabing, Maintal (DE)

(73) Assignee: Roehm GmbH & Co KG, Darmstadt (DE)

( * ) Notice: Subject to any disclaimer, the term of this patent is extended or adjusted under 35 U.S.C. 154(b) by 81 days.

(21) Appl. No.: 09/596,969

(22) Filed: Jun. 20, 2000

(30) Foreign Application Priority Data

Jun. 21, 1999 (DE) .......................... 199 28 352

(51) Int. Cl.⁷ .......................... C08L 33/06; C08L 33/10
(52) U.S. Cl. .................. 524/560; 523/201; 524/296; 524/297; 524/458; 524/523; 524/561; 524/562
(58) Field of Search ...................... 523/201; 524/458, 524/560, 561, 562, 296, 297, 523

(56) References Cited

U.S. PATENT DOCUMENTS

| | | | | |
|---|---|---|---|---|
| 4,071,653 A | * | 1/1978 | Boessler et al. | 428/332 |
| 4,125,700 A | * | 11/1978 | Graham | 204/159 |
| 4,199,486 A | * | 4/1980 | Boessler et al. | 523/201 |
| 4,287,177 A | * | 9/1981 | Nakashima et al. | 424/81 |
| 4,461,869 A | * | 7/1984 | Yang | 525/80 |

FOREIGN PATENT DOCUMENTS

| | | |
|---|---|---|
| DE | 934 498 | 10/1955 |
| DE | 25 43 542 | 4/1977 |
| DE | 39 03 669 | 7/1990 |
| DE | 39 03 700 | 8/1990 |
| EP | 0 381 971 | 8/1990 |
| FR | 2 291 248 | 6/1976 |
| JP | 10-298391 | 11/1998 |

* cited by examiner

Primary Examiner—Judy M. Reddick
(74) Attorney, Agent, or Firm—Oblon, Spivak, McClelland, Maier & Neustadt, P.C.

(57) ABSTRACT

A plastisol is disclosed comprising as a mixture

I. one or more polymers and/or copolymers of (meth) acrylates obtainable by polymerising compositions which contain as polymerisable constituents
   A) 20 to 100 wt. % of methyl methacrylate,
   B) 0 to 80 wt. % of a (meth)acrylate of the formula I other than methyl methacrylate,

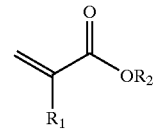

(I)

in which
   $R_1$ denotes hydrogen or methyl and
   $R_2$ denotes a linear or branched alkyl residue having 1 to 18 carbon atoms,
   C) 0 to 40 wt. % of a further unsaturated monomer other than A) and B) and
   D) 0 to 40 wt. % of an adhesion-promoting monomer, wherein A) to D) constitute 100 wt. % of the polymerisable constituents, II. proportions of 5 to 400 parts by weight of plasticisers compatible with the polymers and/or copolymers of I per 100 parts by weight of the latter and III. quantities of 0 to 700 parts by weight of inorganic fillers per 100 parts by weight of component I;

which is distinguished in that the (meth)acrylate polymers and/or copolymers are a) emulsion polymers having b) a bimodal or multimodal primary particle size distribution. In addition to improvements with regard to the mechanical properties of the films obtained, the plastisols themselves exhibit improved storage stability and excellent compatibility with low-cost plasticisers. They furthermore permit a relatively high binder content.

18 Claims, No Drawings

POLY(METH)ACRYLATE PLASTISOLS AND PROCESS FOR THE PRODUCTION THEREOF

DESCRIPTION

This invention relates to poly(meth)acrylate plastisols and to a process for the production thereof. The invention in particular relates to plastisols which contain binders based on poly(meth)acrylates, which in turn exhibit a bimodal primary particle size distribution. The invention furthermore relates to a process for the production of such poly(meth) acrylates having a bimodal primary particle size distribution as are used in the plastisols of the invention.

Plastisols comprise colloidal suspensions of a polymer component (binder) in plasticiser. Plastisols thus generally comprise two-phase systems, one component of which is a polymer and the other a suitable plasticiser. Plastisols are conventionally converted into the finished product form by spreading, casting, dipping, spraying and the like. "Gelation" then proceeds by heating; the plasticisers dissolve the polymer particles. In this manner, a homogeneous product with a greater or lesser degree of flexibility which may be compact or foamed is obtained after cooling. In principle, it is conceivable to use binders based on the most varied polymers. However, only very few polymers are used industrially. By far the most significant class of polymers used for this purpose is derived from polyvinyl chloride (PVC). However, from an environmental standpoint, it would be highly expedient to replace PVC plastisols with more environmentally friendly plastisols. Plastisols based on poly (meth)acrylates have, for example, been available for this purpose for some time. The following publications are cited as close prior art relating to poly(meth)acrylate plastisols:

D1=DE-PS 934 498;

D2=FR-A 2,291,248;

D3=EP 0 774 483 A2;

D4=JP published patent application Hei 10-298391 (10.11.1998).

To some extent depending upon the desired application, plastisols must meet a complex range of requirements. The rheological properties of the plastisol, in particular the viscosity thereof, plastisol storage stability, plasticiser compatibility and the mechanical properties of the products produced from the plastisol are inter alia of vital significance in this connection. The ratio of resin (binder or polymer) to plasticiser is also important for many applications.

The most important characteristic of a plastisol is for it to be processable at a low temperature, i.e. to exhibit a relatively low viscosity and only to gel to yield a solid film on heating and subsequent cooling. Another industrial requirement is for the plastisol to have the lowest possible viscosity in order to permit processing by a wide range of methods. For example, when spreading plastisols, no dilatancy may occur on exposure to the shear rate under the coating knife. Dilatancy may result in coating defects such as non-uniform thickness. Moreover, dilatancy results in the application of large forces onto the knife coater. When applying adhesion layers onto fabrics, the viscosity at low shear rates must be sufficiently high to prevent the plastisol from striking through the fabric. A yield point may additionally be of benefit in this case. Pseudoplasticity is consequently desired for fabric coating. In contrast, a low viscosity at low shear rates is required for impregnation coatings, for example for coating tarpaulins, so that the plastisol completely penetrates the fabric. When dipping gloves which have support fabrics, the viscosity must be sufficiently high for the plastisol not to penetrate too deeply into the fabric during the dipping and draining operation. Although the rheological properties of the plastisol may be modified with additives, it is essentially the resin or binder which exerts the main influence in all the stated cases. While the use of prior art spray-dried emulsion polymers based on poly(meth)acrylates in combination with selected plasticisers does indeed give rise to good gelation characteristics, it also results in low storage stability and relatively high processing viscosities.

Another significant problem of poly(meth)acrylate plastisols is still their inadequate storage stability, i.e. an excessive change in viscosity over extended periods of storage, in comparison with conventional plastisols. D3 attempts to solve the problem of storage stability inter alia by adding ground suspension polymers to emulsion polymers. The addition of such extender polymers firstly results in a considerable reduction in costs. Suspension polymers are distinctly lower in cost than emulsion polymers or dispersions. Moreover, the viscosity of the plastisols is generally reduced and the average particle size is increased. The disadvantage of this process is the fact that a larger particle size makes gelation of the plastisol more difficult, as, under certain circumstances, the larger suspension polymers no longer completely gel within the short time required for industrial use.

It is considered advantageous for many purposes to be able to use plastisols having the highest possible resin content and lowest possible plasticiser content. An elevated plasticiser content in the plastisol may moreover give rise to environmental problems. Pastes (plastisols) having a very high plasticiser content of certain types of plasticiser may accordingly give rise to gelled films from which the plasticiser has a tendency to evaporate or even exude. In such cases, a proportion of the plasticiser is deposited as a liquid film onto the surface of the gelled product. In PMMA plastisols, this occurs especially with dialkyl phthalates which, due to their low cost, otherwise seem to be a very attractive option. According to the prior art, it is possible to process PMMA plastisols having a maximum binder content of 40 to 45%. An increase in the resin content of the plastisol with a concomitant reduction in the plasticiser content would be welcome.

D4 discloses acrylic resin plastisols which are obtained by mixing pulverulent acrylic resins with a small quantity of larger polymer particles of another acrylic resin. Two peaks thus occur in the particle size distribution curve of these resins. In this case, the pulverulent acrylic resin consists to an extent of 90 to 60 wt. % of a fraction having an average particle size of below 10 $\mu$m and to an extent of 10 to 40 wt. % of a fraction having an average particle size of between 10 and 500 $\mu$m. Benzoic acid esters, such as for example tripropylene glycol dibenzoate, are in particular used as the plasticiser for the acrylic resin plastisols stated in D4. The plastisol systems of D4 thus comprise per se known extender systems, i.e. a monomodal emulsion polymer is extended with a finely ground bead polymer (suspension polymer). Although the systems disclosed by D4 exhibit very good compatibility values and the binder content may be greater than 50 wt. % (relative to the total weight of resin and plasticiser), the viscosity and viscosity stability values still appear to require further improvement.

In the light of the prior art cited and discussed above, the object of the present invention was to provide a plastisol based on poly(meth)acrylates and plasticiser which exhibits excellent rheological properties suiting it to numerous different processing methods. The plastisol should here exhibit the lowest possible viscosity which should also remain as stable as possible over an extended period.

Another object of the invention is to provide plastisols having good or improved plasticiser compatibility, i.e. the widest possible range of plasticisers should be usable without substantially degrading the properties of the plastisol or of the films producible therefrom. In particular, compatibility should also be ensured with inexpensive, low cost plasticisers.

Another object of the invention was to provide a plastisol which combines good film characteristics and good gelling capacity with acceptable storage stability.

A further object of the invention was to improve the mechanical properties of gelled plastisol films.

Another object of the invention was to provide poly(meth) acrylate plastisols which permit an elevated binder content of the pastes, if possible a content higher than hitherto possible, without the quality of the other properties of the plastisol or the properties of films obtained therefrom being reduced to an unacceptable level.

These and other objects specified in no greater detail, but which arise or may be derived in a self-evident or obvious manner from the introductory discussion of the prior art, are achieved for the purposes of the invention by a plastisol of claim 1. Advantageous developments of the plastisols according to the invention are protected by the claims which are directly or indirectly subordinate to claim 1.

Because plastisols comprising

I. one or more polymers and/or copolymers of (meth) acrylates obtainable by polymerising compositions which contain as polymerisable constituents
   A) 20 to 100 wt. % of methyl methacrylate,
   B) 0 to 80 wt. % of a (meth)acrylate of the formula I other than methyl methacrylate,

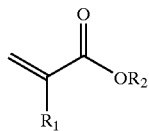

(I)

in which
R$_1$ denotes hydrogen or methyl and
R$_2$ denotes a linear or branched alkyl residue having 1 to 18 carbon atoms,
   C) 0 to 40 wt. % of a further unsaturated monomer other than A) and B) and
   D) 0 to 40 wt. % of an adhesion-promoting monomer, wherein A) to D) constitute 100 wt. % of the polymerisable constituents, II. proportions of 5 to 400 parts by weight of plasticisers compatible with the polymers and/or copolymers of I per 100 parts by weight of the latter and III. quantities of 0 to 700 parts by weight of inorganic fillers per 100 parts by weight of component I;

are distinguished in that the polymers and/or copolymers of the (meth)acrylates are emulsion polymers which exhibit a bi- or multimodal primary particle size distribution, it is possible to achieve a series of advantages in a manner which is not straightforwardly predictable. Such advantages include, inter alia:

In comparison with poly(meth)acrylate plastisols which contain monomodal binders, i.e. which comprise poly (meth)acrylates having a monomodal particle size distribution, as the binder, the viscosity of the plastisol pastes is distinctly lower at an identical binder content. This extends the processing range and the latitude for formulation with auxiliary components, such as for example for imparting flame retardancy or the like.

In comparison with poly(meth)acrylate plastisols which contain monomodal binders, the storage stability of poly(meth)acrylate plastisols according to the invention with a bi- or multimodal binder is significantly higher. As a consequence, products according to the invention may also be used for applications in which the plastisol must be stored for relatively extended periods before processing.

Binder content may be raised distinctly. Whereas in the prior art a binder content of 100 parts of binder to 150 parts of plasticiser is conventional, by using plastisols according to the invention it is possible to produce products which have a ratio of 100 parts of binder to 50 parts of plasticiser. Using prior art binders, these pastes cannot be produced without degrading quality. It is necessary, for example, to use diluents or viscosity-depressing agents such as aliphatic hydrocarbons or alkylbenzenes, which may assume the function of plasticisers, in order to achieve higher binder contents according to the prior art. The higher binder content according to the invention without binder substitutes means that the tendency of the gelled films to release plasticisers as vapour or even to exude them is distinctly reduced or even completely suppressed.

Due to the higher binder content, it is possible to use dialkyl phthalates (for example dioctyl phthalate, diisononyl phthalate etc.) for poly(meth)acrylate plastisols, preferably PMMA plastisols, without giving rise to phase separation in the gelled state. Using these low-cost and inexpensive plasticisers means that it is possible to provide the overall product consisting of binder and plasticiser to processors in a distinctly more favourable and simple manner.

The higher binder content also means that gelled films are obtained which, in comparison with prior art products, have significantly better mechanical properties. The tear strength of the films is, for example, higher.

The plastisols according to the invention have a balanced range of properties, in particular exhibiting improvements with regard to a combination of storage stability, plasticiser compatibility with a raised binder content in the plastisols and improved mechanical properties of films produced therefrom.

Plastisols according to the invention have numerous and varied potential applications. The plastisols according to the invention are suitable for any applications for which PMMA plastisols are intended. This relates in particular to applications in textiles and fabric coating and foam applications (carpets, flooring).

In comparison with known PMMA plastisols having a bimodal particle size distribution (c.f. D4), plastisols according to the invention have distinctly improved properties. According to D4, relatively large suspension polymers (SP) are essentially used as extenders for emulsion polymers (EP). Example 1 and 2 from D4 accordingly relate to EPs (use of ammonium persulfate as initiator), while Example 3 of D4 describes a bead (SP). As a consequence, however, plastisols according to D4 have poorer gelling capacity. Large particles require more energy (heat, time) for gelation. Under comparable temperature and time conditions, gelation is incomplete, which results in surface blemishes in the films.

In comparison with PMMA plastisols with a bimodal particle size distribution, an increase in the binder content of the plastisols according to the invention is also achieved, in particular without using "diluents" such as naphtha, polyglycol derivatives, alkylbenzenes and substances having a similar action. Dispensing with such added substances is advantageous because they are released on gelation or may exude from the gelled product.

Higher binder contents while dispensing with "diluents" also bring about substantial improvements with regard to the modulus of elasticity of the resultant films.

The polymers and/or copolymers which may be used as the binder or as a constituent of the binder in the poly(meth)acrylate plastisols according to the invention comprise a) emulsion polymers having b) a bimodal or multimodal particle size distribution. To the extent that poly(meth)acrylate plastisols having a bimodal distribution were known in the prior art, they exclusively comprised mixtures of polymer powders, at least one of which was produced in a manner other than by emulsion polymerisation. The prior art accordingly merely discloses mixtures of emulsion and suspension polymers which, as has already been mentioned in the introduction, exhibit distinctly larger particle sizes and were used as considerably cheaper raw materials to extend costly emulsion polymers.

For the purposes of the invention, a bi-, poly- or multimodal primary particle size distribution of the poly(meth)acrylate is deemed to exist if, when analysed by the PIDS method using the Coulter LS230 laser particle analyser taking the optical parameters of the particles and the suspending liquid into account, a sample of the polymer used as or in the binder exhibits (at least) two peaks in the distribution curve. The particle size distribution is in particular determined on the basis of size distribution of primary particles in dispersions. Once the dispersion or dispersions have been dried, the primary particles from the dispersion may have agglomerated into secondary particles having a different particle size distribution. However, this has no substantial negative influence upon the action of the binder and in relation to the properties of the plastisol and products obtainable therefrom.

The bi- or multimodal poly(meth)acrylate emulsion polymers and/or copolymers may, in principle, be obtained by emulsion polymerising monomers to yield polymers with a bi- or multimodal particle size distribution or by mixing two or more suitable monomodal emulsion polymers which differ with regard to particle size distribution. The monomodal emulsion polymers may in turn comprise polymers which are obtained directly by emulsion polymerisation, but it is also possible to use fractions of emulsion polymers which have been obtained by separation, for example by screening, from an emulsion polymer.

One preferred variant for obtaining a bi- or multimodal poly(meth)acrylate binder (bimodal or multimodal dispersion) for a plastisol according to the invention accordingly provides the mixing of two or more dispersions which have a monomodal distribution. The dispersion mixture may then be dried in a manner known per se, for example by spray drying, so as to isolate the binder. Alternatively, by making an appropriate selection of different seed latices, it may be advantageous to produce the required dispersion having particles with a bi- or multimodal size distribution directly by growing monomer on the different seed latices. However, due to greater reproducibility, it is distinctly preferred to mix monomodal dispersions. In order to obtain the polymers and/or copolymers, the mixture of the dispersions may, for example, be spray dried. Other options for isolating particles from dispersions may, of course, be considered. Polymers/copolymers isolated from monomodal dispersions may also be mixed.

In a clear contrast with the prior art which includes bimodal poly(meth)acrylate plastisols in which the proportion (mass or weight percent) of smaller particles is greater than the proportion of larger particles, it has surprisingly been found in relation to the present invention that, with a relatively larger proportion by mass or weight of larger particles, it is possible to achieve a distinct improvement in the properties of the plastisol according to the invention and the mouldings or films produced therefrom. Thus, according to the prior art, the average particle size of the binder is increased by extending emulsion polymers with suspension polymers. In contrast, according to the invention, the average particle size of emulsion polymers in the mixture is reduced. This results in an enlarged surface area and nevertheless surprisingly in a reduction in the viscosity of the plastisol.

In a convenient development of the invention, the plastisol is characterised in that the ratio of the weight of the particles of a first mode of the primary particle size distribution with a smaller average particle diameter to the weight of the particles of a second mode of the primary particle size distribution with a larger average particle diameter is less than one.

There are also particularly convenient ranges for the purposes of the invention with regard to the average particle sizes of the primary particles of the binder. Particularly favourable plastisols according to the invention are those in which binders are obtained in which the average particle diameter of a first mode of the primary particle size distribution is within the range between 50 and 500 nm, while the average particle diameter of a second mode of the primary particle size distribution is in the range between 600 and 2000 nm. The characteristics desired according to the invention are particularly pronounced in these particle size ranges.

Particularly favourable plastisols according to the invention are also those in which binders are obtained in which the average particle diameter of a first mode of the primary particle size distribution is within the range between 100 and 600 nm, while the average particle diameter of a second mode of the primary particle size distribution is in the range between 800 and 1500 nm. The characteristics desired according to the invention are particularly pronounced in these particle size ranges and the desired particle size ranges for the modes are more simply achievable.

Plastisols of most particular interest are those having binders in which the average particle diameter of a first mode of the primary particle size distribution is within the range between 100 and 250 nm, while the average particle diameter of a second mode of the primary particle size distribution is in the range between 800 and 1200 nm.

As already indicated, the plastisol according to the invention may comprise bi- or multimodal binders, but particular emphasis should be placed upon bimodal binders. Sometimes not inconsiderable improvements may be achieved with tri- or multimodal binders, but the effort involved is also generally considerably greater. A preferred embodiment is thus characterised in that the polymer and/or copolymer present as binder in the plastisol exhibits a bimodal primary particle size distribution.

In bimodal embodiments, particularly significant effects may be achieved by the average diameter of the large latex particles being larger by a factor of at least 4, better by a factor of 6 to 10, than the average diameter of the small latex particles, in each case determined as the primary particle diameter in the dispersion.

Still more favourable properties may be achieved by combining the large and small latex particles in a specific weight or mass ratio. Mixtures of approx. 60 to 80% of large particles and correspondingly 40 to 20% of small particles have proved particularly advantageous. The range around 70 to 75% of the large particles and 30 to 25% of the small particles, relative to the total weight or total mass of the binder, is particularly preferred.

In the case of a bimodal particle size distribution of the binder, preferred plastisols are those in which the ratio of the weight of the primary particles of the first mode to the weight of the primary particles of the second mode is 1:19 to 1:1.22. An exceptionally advantageous plastisol is characterised in that the ratio of the weight of the primary particles of the first mode to the weight of the primary particles of the second mode is 1:3 to 1:1.86.

A further improvement in the properties of plastisols according to the invention may also be achieved inter alia by the molecular weight of the binder polymers used. A preferred variant provides that the weight average molecular weight $\overline{M}_W$ of the (meth)acrylate polymers and/or copolymers is >2,000,000 g/mol. Highly advantageously, it is possible in this manner to produce still more storage stable plastisols having a still lower viscosity. Using (meth)acrylate polymers and/or copolymers having relatively high molecular weights and thus relatively long polymer chains unexpectedly results in a reduction of the viscosity of the plastisols.

Under normal circumstances, an increase in the molecular weights or chain lengths in polymer solutions or emulsions also results in more rapid segregation and thus in poorer storage stability. Contrary to expectations, however, the storage stability of the plastisols rises as the polymer chain lengths increase. A substantially reduced tendency towards segregation is observed in plastisols containing binders with a high molecular weight than in plastisols comprising prior art polymers.

Particularly advantageous plastisol properties are achieved if the weight average molecular weight $\overline{M}_W$ of the polymers and/or copolymers of the (meth)acrylate used in the plastisols is >3,000,000 g/mol.

(Meth)acrylates used in the plastisols according to the invention are preferably those in which the residue $R_2$ of the (meth)acrylate of the formula I comprises a linear or branched ($C_1$–$C_8$) alkyl residue. Of these, the methyl residue is particularly preferred for $R_2$.

For the purposes of the invention, the term "(meth)acrylate" means acrylate and/or methacrylate.

The weight average molecular weight $\overline{M}_W$ of a polymer is determined for the purposes of the invention by SEC or GPC (size exclusion chromatography or gel permeation chromatography) relative to a polystyrene standard. SEC or GPC are analytical methods known to the person skilled in polymer science for determining average molecular weights.

Another parameter usable for the purposes of the invention for characterising the molecular weight of the polymers and/or copolymers used is the viscosity number, VN. The viscosity number is determined in accordance with DIN 51 562, parts 1 and 3 (January 1983 and May 1985 editions respectively), in accordance with DIN 7745, part 2, appendices A to C, April 1989 edition.

Preferred embodiments of plastisols according to the invention thus contain polymers and/or copolymers having a VN of ≧300, preferably of >300, conveniently of >600, particularly preferably of >900, very particularly preferably of >1200.

A linear or branched ($C_1$–$C_{18}$) alkyl residue is taken to mean a range of alkyl residues starting from methyl and ethyl and continuing to a radical comprising 18 C atoms. Any conceivable bond isomers within the group are also included.

The person skilled in the art takes monomers other than A) and B) to mean styrene and the derivatives thereof, vinyl esters, such as for example vinyl acetate, vinyl propionate, vinyl esters of higher alkyl acids, maleic anhydride, itaconic acid and the esters thereof, olefins, such as for example ethene, propene, isobutene etc.

Adhesion-promoting monomers as constituents of the polymers are taken to mean those free-radically polymerisable monomers which have functional groups which may interact with the materials which are to be coated. Such interaction may come into being, for example, by hydrogen bridge formation, complexation, dipole forces and the like, which generally involve heteroatoms such as nitrogen or oxygen. Functional groups which may be mentioned are the amino, in particular dialkylamino, (cyclic) amide, imide, hydroxy, oxy, carboxyl, cyano group. Such monomers are known per se (c.f. H. Rauch Puntigam, Th. Völker, Acryl- und Methacrylverbindungen, Springer-Verlag 1967; Kirk-Othmer, Encyclopedia of Chemical Technology, 3rd. Ed., Vol. 1, pp. 394–400, J. Wiley 1978; DE-A 25 56 080; DE-A 26 34 003).

The adhesion-promoting monomers thus preferably belong to the class of vinyl heterocyclic compounds containing nitrogen preferably having 5-membered as well as 6-membered rings, and/or of copolymerisable vinyl carboxylic acids and/or the hydroxyalkyl-, alkoxyalkyl- and aminoalkyl-substituted esters or amides of acrylic and methacrylic acid.

Nitrogen heterocyclic monomers which may in particular be mentioned are those from the class of vinylimidazoles, vinyllactams, vinylcarbazoles and vinylpyridines. Examples, which are not intended to be limiting in any manner, of these monomeric imidazole compounds are N-vinylimidazole (also known as 1-vinylimidazole), N-vinyl-2-methylimidazole, N-vinyl-2-ethylimidazole, N-vinyl-2-phenylimidazole, N-vinyl-2,4-dimethylimidazole, N-vinylbenzimidazole, N-vinylimidazoline (also known as 1-vinylimidazoline), N-vinyl-2-methylimidazoline, N-vinyl-2-phenylimidazoline and 2-vinylimidazole.

Examples of monomers derived from lactams which may in particular be mentioned are the following: N-vinylpyrrolidone, N-vinyl-5-methylpyrrolidone, N-vinyl-3-methylpyrrolidone, N-vinyl-5-ethylpyrrolidone, N-vinyl-5,5-dimethylpyrrolidone, N-vinyl-5-phenylpyrrolidone, N-allylpyrrolidone, N-vinylthiopyrrolidone, N-vinylpiperidone, N-vinyl-6,6-diethylpiperidone, N-vinylcaprolactam, N-vinyl-7-methylcaprolactam, N-vinyl-7-ethylcaprolactam, N-vinyl-7,7-dimethylcaprolactam, N-allylcaprolactam, N-vinylcapryllactam.

The following may in particular be mentioned among monomers derived from carbazole: N-vinylcarbazole, N-allylcarbazole, N-butenylcarbazole, N-hexenylcarbazole and N- (methyl-1-ethylene)carbazole. Copolymerisable vinyl carboxylic acids which may in particular be mentioned are acrylic and methacrylic acid or suitable salts thereof.

The following oxy- or alkoxy-substituted alkyl esters of (meth)acrylic acid may furthermore be mentioned: 2-hydroxyethyl(meth)acrylate, hydroxypropyl(meth)acrylate, 2-methoxyethyl(meth)acrylate, 2-ethoxyethyl(meth)acrylate, 2-butoxyethyl(meth)acrylate, 2-(2- butoxyethoxy)ethyl methacrylate, 2-(ethoxyethyloxy)ethyl (meth)acrylate, 4-hydroxybutyl(meth)acrylate, 2-[2-(2-ethoxyethoxy)ethoxy]ethyl(meth)acrylate, 3-methoxy-1-butyl(meth)acrylate, 2-alkoxymethylethyl(meth)acrylate, 2-hexoxyethyl(meth)acrylate.

The following amine-substituted alkyl esters of (meth) acrylic acid may furthermore be mentioned:

2-dimethylaminoethyl(meth)acrylate, 2-diethylaminoethyl(meth)acrylate, 3-dimethylamino-2,2-dimethyl-1-propyl(meth)acrylate, 3-dimethylamino-2,2-dimethyl-1-propyl(meth)acrylate, 2-morpholinoethyl (meth) acrylate, 2-tert.-butylaminoethyl(meth)acrylate, 3-(dimethylamino)propyl(meth)acrylate, 2-(dimethylaminoethoxyethyl)(meth)acrylate.

The following monomers may, for example, be mentioned as examples of (meth)acrylamides:

N-methyl(meth)acrylamide, N-dimethylaminoethyl (meth)acrylamide, N-dimethylaminopropyl(meth) acrylamide, N-isopropyl(meth)acrylamide, N-tert.-butyl (meth)acrylamide, N-isobutyl(meth)acrylamide, N-decyl (meth)acrylamide, N-cyclohexyl(meth)acrylamide, N-[3-(dimethylamino)2,2-dimethylpropyl](meth)acrylamide, N-[2-hydroxyethyl](meth)acrylamide.

The plastisols according to the invention contain per se known plasticisers in the quantities conventional for plasticisers, for example plasticisers conventional for PMMA plastisols (but also for PVC plastisols), in particular phthalic acid esters, as well as adipic acid and/or sebacic acid esters, chlorinated paraffins, trialkyl phosphates, aliphatic or araliphatic polyesters as well as other polymeric plasticisers, such as for example soft urea resins. (C.f. H. K. Felger, Kunststoff-Handbuch volume 1/1C, Hanser-Verlag 1985 and H. F. Mark et al. Encyclopedia of Polymer Science and Engineering, Supplemental Volume pages 568–647, J. Wiley 1989). A selection of suitable plasticisers may also be found in DE-C 25 43 542. Plasticisers or plasticiser combinations which are preferably considered are those which, over a storage period of the formulated plastisols of 3 weeks at 30° C., bring about a less than ten-fold, in particular less than five-fold increase in viscosity relative to the initial viscosity. The following may in particular be mentioned, dioctyl phthalate, diisodecyl phthalate, diethylhexyl phthalate, di-$C_7$–$C_{11}$-n-alkyl phthalate, tricresyl phosphate, dibenzyltoluene (LIPINOL®T, product of Hüls AG), 2,2,4-trimethyl-1,3-pentanediol dibenzoate (Benzoflex® 354, product of Velsicol) and benzyloctyl phthalate.

The plastisols furthermore usually contain other per se known inorganic fillers in quantities of up to 700 parts by weight. The following may be mentioned by way of example of Theologically active additives, calcium carbonate (chalk), titanium dioxide, calcium oxide, perlite, precipitated and coated chalks, optionally together with thixotroping agents such as for example pyrogenic silica. Grain size is usually in the range from 5 to 25 μm. Depending upon the application, the plastisols may also contain per se known auxiliaries such as coupling agents, wetting agents, stabilisers, levelling agents, blowing agents in quantities of 0 to 5 wt. % (relative to the plastisols).

Calcium stearate may, for example, be mentioned as a levelling agent.

The plastisols according to the invention are suitable for any applications for which PVC or PMMA plastisols are intended. Such applications which may in particular be considered are wear layers for floor coverings, self-supporting transparent films, vehicle underbody sealants, corrosion protection for metals, interlayers (foamed) for floor coverings, carpets, plastic-coated tarpaulins, car roof liners, dashboard trim, crown corks.

The present invention also provides a process for the production of plastisols in which components I, II and III, optionally together with further per se known added substances, are suitably mixed together, wherein the process of the invention is distinguished in that emulsion polymers and/or copolymers having a bi- or multimodal primary particle size distribution are used. Two previously dried and mixed dispersions each having a monomodal primary particle size distribution are preferably used as component I, wherein the peak maxima of the individual modes correspond to differing particle sizes.

It is known to produce polymeric (meth)acrylates having relatively small particle sizes for use in plastisols by emulsion polymerisation. The "seed latex process" is, for example, known for this purpose. Feasible particle sizes in this process may be assumed to be approx. less than 1000 nm. It has not hitherto been known to produce primary particles based on poly(meth)acrylates, preferably PMMA, by emulsion polymerisation, which are of a size suitable for the preferred ranges of the invention, most especially not by means of an industrially acceptable process.

It was thus furthermore desirable to provide a process which permits the production of the particles required for preferred variants of the invention in an industrially usable process.

This may be achieved by incorporating a dispersion means into the feed line from which the monomers are fed or into the reactor itself in a per se known process for the production of (meth)acrylate polymers and/or copolymers by emulsion polymerisation.

By combining an emulsion feed process with a seed latex process, wherein the emulsion feed is ultra-finely emulsified immediately before entering the reactor or directly in the reactor, it is possible to reduce the long reaction time conventional for (meth)acrylate monomers in a seed latex process to an industrially acceptable level such that a minimum of coagulate and reactor soiling occurs.

In this process, the distance to be covered by the feed emulsion between the dispersion location and the reaction location should be as short as possible. The dispersion means is preferably arranged in the monomer feed line immediately by the reactor inlet.

The dispersion means may assume any particular form, provided that the desired effect is achieved, namely that the monomer droplets are dispersed as finely as possible before feeding into the dispersion in the polymerisation vessel. "As fine as possible" is taken in this connection to mean the state obtained when, for example in the feed of a 5 liter apparatus, a power of 20 to 50 Watts is introduced into an ultrasound flow cell of a capacity of 5 mL at a flow rate of 10 to 40 mL/min (UP50 H ultrasonicator from Hielscher GmbH). An emulsion treated as described in Example 4 should also be deemed to be "as fine as possible" for the purposes of the invention.

Dispersion means which comminute the droplets mechanically have proved effective. These include rotating means and similar arrangements. Dispersers operating by means of ultrasound are also advantageous.

Poly(meth)acrylate latices having an average particle diameter of 1000 nm or more may be obtained in the stated manner by emulsion polymerisation. This has not hitherto been possible for (meth)acrylate monomers using the seed latex process.

The measure of the invention, namely of very finely emulsifying the emulsion to be apportioned directly upstream from the inlet, ensures that the monomer droplets in the emulsion are very fine, although only a very low emulsifier concentration is used. The small droplet size gives rise to an elevated specific surface area and ensures that the monomer in the aqueous phase leaves very much more rapidly, as is required for emulsion polymerisation. The apportioned monomer enters the latex particles more rapidly and is polymerised therein. At an identical feed rate, using this process the monomer is very much more rapidly polymerised and does not accumulate in the reaction vessel. This may firstly be recognised from the fact that the heat transfer rate during the reaction is higher according to this process than without emulsification upstream from the reactor inlet. Secondly, if emulsification is not performed, a vigorous post-reaction occurs at the end of the reaction; the accumulated monomer reacts, which is manifested by a distinct rise in the temperature of the medium. This does not occur in the process of the invention.

A further advantage of the invention is that the very severe coagulation conventional in a seed latex process does not occur. The coagulate content of dispersions according to the invention is not generally measurable. Moreover, reactor soiling in the process of the invention is distinctly lower than in prior art processes.

The above-stated monomers, in particular methyl methacrylate, and optionally also the group B monomers, are in principle suitable for the production of core/shell polymers.

The structure of polymers and/or copolymers comprising a core material and a shell material is obtained in a manner known per se by performing the emulsion polymerisation in a certain manner. In this process, the monomers forming the core material are polymerised in an aqueous emulsion in the first stage of the process. Once the monomers have completely polymerised in the first stage, the monomer constituents of the shell material are added to the emulsion polymer under conditions such that the formation of new particles is avoided. In this way, the polymer formed in the second stage is deposited as a shell around the core material.

In the first polymerisation stage, in which the core material is obtained, 0.01 to 3 wt. %, relative to the monomer, of anionic, cationic or nonionic emulsifiers are used, such as sodium lauryl sulfate, alkylbenzene sulfonates, ethoxylation products of alkylated phenols or the neutralised sulfonation products thereof.

Polymerisation is preferably initiated at temperatures of between 60 and 100° C. with the assistance of water-soluble free-radical formers, such as potassium persulfate or ammonium persulfate or hydrogen peroxide. Further initiator may be added before the beginning of the second stage of polymerisation, but little or even no additional emulsifier is used in the second stage.

EXAMPLES

The Examples only describe the synthesis of pure PMMA polymers, but this should not be taken to be exclusive. The use of comonomers as described above is self-evident for the person skilled in the art. Certain industrial requirements may be further improved by selection of the comonomer.

Example 1

Product A 1383 g of completely deionised (CD) water is introduced into the 5 L reactor of an apparatus (stirrer, reflux condenser, feed pump, water bath, nitrogen atmosphere). This initial amount is heated with the water bath to an internal temperature of 73° C.–75° C. while being stirred.

An emulsion of the following composition, which was produced under a nitrogen atmosphere, is added to the initial amount in a first feed period of approx. 1–10 minutes: 141 g of CD water; 4.4 g of Disponil SUS IC 875 di-2-ethylhexyl sulfosuccinate, sodium salt (manufacturer: Henkel KGaA); 328.8 g of methyl methacrylate; 0.3 mL of sodium hydrogen sulfite, 5% solution. A redox system (2.3 mL of sodium peroxydisulfate, 5% solution; 1.5 mL of sodium hydrogen sulfite, 5% solution), which initiates polymerisation, is then introduced into the reactor. The reactor must be cooled to prevent the temperature from rising above 75° C.–77° C.

A relatively sharp fall in the internal temperature is then observed due to the 1st portion having been almost completely reacted, then a second emulsion of the following composition, likewise produced under a nitrogen atmosphere, is apportioned within 1–10 minutes: 140.9 g of CD water; 4.4 g of Disponil SUS IC 875; 328.6 g of methyl methacrylate; 0.32 mL of sodium hydrogen sulfite, 5% solution. In this case too, an excessive rise in temperature above 75° C.–77° C. should be avoided.

When a perceptible drop in internal temperature is again observed due to the reaction being almost complete, the third emulsion of the following composition (produced under a nitrogen atmosphere) is added at a feed rate of 55.4 g/minute: 748.1 g of CD water; 23.2 g of Disponil SUS IC 875; 1745 g of methyl methacrylate; 1.68 mL of sodium hydrogen sulfite, 5% solution. A slight increase in the internal temperature to approx. 75° C.–77° C. is observed after 5–20 minutes, indicating that polymerisation of the last portion has begun. The internal temperature during this feed operation should maintained at approx. 75° C., optionally by cooling. Once addition of the emulsion is complete, the mixture is post-reacted for 30 minutes at a water bath temperature of 75° C. The product is cooled to room temperature and filtered through a 125 μm gauze.

Product A $$VN = \eta_{sp/c} = 995 \text{ cm}^3/\text{g}$$

Primary particle size: 198 nm (5%<130 nm; 5%>280 nm)

Primary particle size and the distribution thereof are determined with a laser diffraction instrument (Coulter LS230).

Solids content: 48.3%

Example 2

Product B

As Example 1. Particle size is adjusted to approx. 160 nm by increasing the emulsifier concentration.

$$VN = \eta_{sp/c} = 928 \text{ cm}^3/\text{g}$$

Primary particle size: 158 nm (Coulter LS230) (5%<110 nm; 5%>210 nm).

Solids content: 48.7%

Example 3

Product C

As Example 1. Particle size is adjusted to approx. 100 nm by increasing the emulsifier concentration.

$$VN = \eta_{sp/c} = 1125 \text{ cm}^3/\text{g}$$

Primary particle size: 100 nm (Coulter LS230) (5%<60 nm; 5%>140 nm).

Solids content: 48.7%

Example 4

Product D

Product D is produced in a 1000 L reactor using a seed latex process.

263 L of water are initially introduced into the reactor equipped with an impeller agitator. 0.84 kg of product A (seed latex) are added and the contents heated to 80° C. In parallel, an emulsion consisting of 183.6 kg of methyl methacrylate, 79 kg of water and 0.612 kg of Disponil SUS IC 875 is produced in a separate container.

13.2 g of sodium peroxydisulfate and 11.2 g of sodium bisulfate are introduced into the reactor. The agitator speed is set to 80 rpm. The emulsion described above is then apportioned initially for 25 minutes at a rate of 0.9 kg/min. An Ystral disperser (model X40P-41G1, 2 mm slot width) is fitted in the feed line in order to divide the emulsion into very fine particles immediately before it enters the reactor. After the 25 minute period, the temperature is reduced to 75° C. and the remainder of the emulsion is apportioned at a rate of 1.8 kg/min over a period of 130 minutes. Just before the end of feeding, the speed of the agitator is adjusted to 50 rpm. Once feeding is complete, the mixture is stirred for 30 minutes at 75° C. No exothermic reaction occurs during this period. After cooling, the emulsion is discharged through a gauze screen (250 micron mesh size). Virtually no coagulate is present (<0.01%) and the reactor wall is unsoiled.

Solids content: 33.7%
Particle size: 954 nm (monomodal)

$VN = \eta_{sp/c} = 693$ cm$^3$/g

Example 5 (Comparison with Example 4)

The reaction is performed in exactly the same manner as in Example 4. However, the disperser is removed from the feed line, such that the emulsion is not ultra-finely divided immediately before it enters the reactor.

The reaction starts up distinctly more slowly and exhibits an exothermic phase during the post-reaction period, the reaction temperature rising by approx. 2° C.

0.8% of coagulate is formed and the reactor wall is severely soiled once the reaction is complete.

Solids content: 32.7%
Particle size distribution: bimodal (400 nm and 720 nm)

$VN = \eta_{sp/c} = 480$ cm$^3$/g

This Example is unusable in the production of a bimodal primary particle distribution suitable for plastisols.

Example 6 (Comparison with Example 4)

As Example 5, but the feed times are doubled.
Increase in temperature during post-reaction: 0.5° C.
Coagulate: 0.6%
Severe reactor soiling.
Solids content: 32.4%
Primary particle size: 971 nm (monomodal).

Example 7 (Comparative Example to JP-10-298391)

Product E
Production of the suspension polymer according to reference Example 3 from JP-10-298391).

The suspension polymer was produced as stated in reference Example 3 in JP-10-298391. The initiator used was tert.-butyl per-2-ethylhexanoate.

Weight average molecular weight of the resultant polymer product E: 93,000 g/mol determined by SEC (GPC) against a polymethyl methacrylate standard;

average particle size: 24 $\mu$M (24,000 nm) (Coulter LS230);

Example 8

Production of dispersions having a bimodal primary particle size distribution and drying.

Product D was mixed with product A, B, C or E to obtain bimodal products A'–C' and E'. The mixing ratio is relative to the content by weight of the particular particles in the dried solid.

The mixed dispersions are dried in a spray dryer with a centrifugal atomiser. The rotational speed of the atomiser is 20,000 revolutions/min. The outlet temperature is set to 75° C.

The spray dried powder (binder A'–C' and E') in each case exhibits an average grain diameter of approx. 20 microns. Grain diameter may be reduced by grinding, which generally has a positive effect on product properties. No grinding was performed.

Production of the Plastisols

The polymers (products A' to C' and E') were mixed with plasticiser using a disperser in a ratio (ratio by weight) shown in the following tables. The plastisol compositions were applied with a coating knife and gelled for 30 minutes at 140° C. in an electric oven. The pastes were otherwise produced in accordance with the method stated in ISO DIN 11 468.

The viscosity of the plastisol paste before gelation (DIN 53018 part 1 and part 2 and DIN 53019 part 1) and plasticiser migration from the film were investigated. The tensile strength and elongation at break of the gelled films were also measured (DIN 53455).

1. Mixing Ratio

| Santicizer 141 (diphenyloctyl phosphate; Solutia Inc.) | | | | |
|---|---|---|---|---|
| Brookfield visc. [mpas] | Product D: Product A 65:35 | Product D: Product A 70:30 | Product D: Product A 75:25 | Product A (comparison) |
| initial | 280 | 280 | 280 | 760 |
| 1 day | 280 | 280 | 320 | 760 |
| 5 days | 320 | 320 | 320 | 1600 | in each case 100 parts of binder and 150 parts of plasticiser

| Santicizer 261 (benzyloctyl phthalate; Solutia) | | | | |
|---|---|---|---|---|
| Brookfield visc. [mPas] | Product D: Product A 65:35 | Product D: Product A 70:30 | Product D: Product A 75:25 | Product A (comparison) |
| initial | 800 | 800 | 840 | 1760 |
| 1 day | 920 | 960 | 1040 | 2000 |
| 5 days | 1000 | 960 | 1080 | 2500 | in each case 100 parts of binder and 150 parts of plasticiser

| Santicizer 141 | | | | |
|---|---|---|---|---|
| Brookfield visc. [mPas] | Product D: Product A 65:35 | Product D: Product A 70:30 | Product D: Product A 75:25 | Product A (comparison) |
| initial | 480 | 480 | 480 | 1400 |
| 1 day | 640 | 540 | 640 | 2480 |
| 5 days | 2120 | 2120 | 2120 | 21200 | in each case 100 parts of binder and 150 parts of plasticiser

| Santicizer 261 | | | | |
|---|---|---|---|---|
| Brookfield visc. [mPas] | Product D: Product A | Product D: Product B | Product D: Product C | Product A (comparison) |
| initial | 840 | 800 | 1160 | 1760 |
| 1 day | 1040 | 880 | 1280 | 2000 |
| 5 days | 1080 | 960 | 1440 | 2500 |

3. Increase in Binder Content

| | Plasticiser: dioctyl phthalate (Palatinol AH; BASF) always relative to 100 parts of binder | | | | |
|---|---|---|---|---|---|
| | Product D: Product A 73:27 100 parts plasticiser | Product D: Product A 73:27 80 parts plasticiser | Product D: Product A 73:27 60 parts plasticiser | Comparison: Product A 100 parts plasticiser | Comparison: Product A 80 parts plasticiser |
| Initial Brookfield [mPas] | 1,700 | 5,600 | 23,200 | 76,000 | Paste cannot be produced |
| Gelation 30 min/160° C. | + | + | + | + | − |
| Exudation of plasticiser | very slight | no exudation | no exudation | very slight | − |
| Tear strength | 7.0 MPa | 12.4 MPa | 23.2 MPa | 8.3 MPa | − |
| Elongation at break | 98% | 67% | 10% | 92% | − |

4. Tests for Comparison with JP-10-298391

| Santicizer 261 | | | | |
|---|---|---|---|---|
| Brookfield visc. | Product D: Product A 65:35 | Product D: Product A 70:30 | Product D: Product A 75:25 | Product A (comparison) |
| initial | 1680 | 1640 | 1600 | 4830 |
| 1 day | 2160 | 2080 | 2040 | 7080 |
| 5 days | 2640 | 2540 | 2520 | 10560 |

2. Size Ratio

Mixing ratio of large to small particles:

73:27 in each case 100 parts of binder and 150 parts of plasticiser

| Santicizer 141 (diphenyloctyl phosphate; Solutia Inc.) | | |
|---|---|---|
| Brookfield Visc. [mPas] | Product D: Product E 80:20 | Product D: Product E 70:30 |
| initial | 280 | 280 |
| 1 day | 280 | 300 |
| 5 days | 300 | 300 | in each case 100 parts of binder and 150 parts of plasticiser.

Extrememly sever sedimentation of the dispersed particles occurred in comparison with the Examples according to the invention from 1.

| Santicizer 141 | | | | |
|---|---|---|---|---|
| Brookfield visc. [mPas] | Product D: Product A | Product D: Product B | Product D: Product C | Product A (comp.) |
| initial | 280 | 240 | 220 | 760 |
| 1 day | 320 | 240 | 240 | 760 |
| 5 days | 320 | 280 | 240 | 1600 |

| Santicizer 261 (benzyloctyl phthalate; Solutia) | | | | |
|---|---|---|---|---|
| Brookfield visc. [mPas] | Product D: Product E 80:20 | Product D: Product E 70:30 | Product D: Product A 70:30 | Product A (comparison) |
| initial | 960 | 840 | 800 | 1760 |
| 1 day | 1120 | 980 | 960 | 2000 |
| 5 days | 1350 | 1250 | 960 | 2500 | in each case 100 parts of binder and 150 parts of plasticiser.

Extremembly severe sedimentation of the dispersed particles, which comprise product E, occurred in this case too in comparison with the Examples according to the invention from 1, some of which are shown again in the Table.

| Brookfield visc. [mPas] | Santicizer 141 | | | |
|---|---|---|---|---|
| | Product D: Product E 80:20 | Product D: Product E 70:30 | Product D: Product A 70:30 | Product A (comparison) |
| initial | 730 | 680 | 480 | 1400 |
| 1 day | 850 | 780 | 640 | 2480 |
| 5 days | 3450 | 2980 | 2120 | 21200 | in each case 100 parts of binder and 100 parts of plasticiser.

In this case too the dispersed particles, which comprise product E, sediment in comparison with the Examples according to the invention from 1, some of which are shown again in the Table.

| Brookfield visc. | Santicizer 261 | | | |
|---|---|---|---|---|
| | Product D: Product E 80:20 | Product D: Product E 70:30 | Product D: Product A 70:30 | Product A (comparison) |
| initial | 3500 | 2980 | 1640 | 4830 |
| 1 day | 4850 | 3540 | 2080 | 7080 |
| 5 days | 6400 | 4620 | 2540 | 10560 | in each case 100 parts of binder and 100 parts of plasticiser; the batches containing product E exhibited no sedimentation, but the viscosity values are poorer approximately by a factor of 2.

Gelation of the films:

After 30 minutes at 140° C., the films of the Comparative Examples, which contained product E, from the tables with Santiciser 261 did not exhibit complete gelation. At least 45 minutes are required at this temperature in order to obtain a homogeneous, particle-free film. This is not the case with the Examples according to the invention.

Comparison with point 3: Increase in binder content
100 parts product D:E=80:20+100 parts plasticiser
initial Brookfield: 56,000 mPas
Gelation: incomplete
Exudation: very slight
Tear strength: 4.5 Mpa
Elongation at break: 105%
100 parts product D:E=80:20+80 parts plasticiser
Initial Brookfield: Paste cannot be produced
100 parts product D:E=70:30+100 parts plasticiser
Initial Brookfield: 46,000 mPas
Gelation: incomplete
Exudation: very slight
Tear strength: 3.8 Mpa
Elongation at break: 113%
100 parts product D:E=70:30+80 parts plasticiser
Initial Brookfield: Paste cannot be produced

What is claimed is:

1. Plastisol comprising as a mixture
   I. one or more homopolymers or copolymers of (meth)acrylates obtained by emulsion polymerising compositions which contain as polymerisable constituents
      A) 20 to 100 wt. % of methyl methacrylate,
      B) 0 to 80 wt. % of an alkyl(meth)acrylate other than methyl methacrylate, wherein the alkyl is linear or branched, having 1 to 18 carbon atoms,
      C) 0 to 40 wt. % of a further unsaturated monomer other than A) and B) and
      D) 0 to 40 wt. % of an adhesion-promoting monomer, wherein A) to D) constitute 100 wt. % of the polymerisable constituents,
   II. 5 to 400 parts by weight of plasticisers compatible with component I per 100 parts by weight of component I and
   III. 0 to 700 parts by weight of inorganic fillers per 100 parts by weight of component I; wherein
   component I has a bimodal or multimodal primary particle size distribution, and wherein said component I has a weight average molecular weight of >3,000,000 g/mol.

2. Plastisol according to claim 1, wherein the ratio of the weight of the particles of a first mode of the primary particle size distribution with a smaller average particle diameter to the weight of the particles of a second mode of the primary particle size distribution with a larger average particle diameter is less than one.

3. Plastisol according to claim 1, wherein the average particle diameter of a first mode of the primary particle size distribution is within the range between 50 and 500 nm, while the average particle diameter of a second mode of the primary particle size distribution is in the range between 600 and 2000 nm.

4. Plastisol according to claim 1, wherein the average particle diameter of a first mode of the primary particle size distribution is within the range between 100 and 250 nm, while the average particle diameter of a second mode of the primary particle size distribution is in the range between 800 and 1200 nm.

5. Plastisol according to claim 2, wherein component I exhibits a bimodal primary particle size distribution.

6. Plastisol according to claim 5, wherein the ratio of the weight of the primary particles of the first mode to the weight of the primary particles of the second mode is 1:19 to 1:1.22.

7. Plastisol according to claim 5, wherein the ratio of the weight of the primary particles of the first mode to the weight of the primary particles of the second mode is 1:3 to 1:1.86.

8. Plastisol according to claim 1, wherein the alkyl has 1 to 8 carbon atoms.

9. Plastisol according to claim 1, wherein the alkyl(meth)acrylate is alkyl methacrylate.

10. Plastisol according to claim 1, wherein component I is a physical mixture of two polymers.

11. Shaped article comprising a gelled plastisol according to claim 1.

12. A process of producing a plastisol, wherein the plastisol comprises as a mixture
   I. one or more homopolymers or copolymers of (meth)acrylates obtained by emulsion polymerising compositions which contain as polymerisable constituents
      A) 20 to 100 wt. % of methyl methacrylate,
      B) 0 to 80 wt. % of an alkyl(meth)acrylate other than methyl methacrylate,
         wherein the alkyl is linear or branched, having 1 to 18 carbon atoms,
      C) 0 to 40 wt. % of a further unsaturated monomer other than A) and B) and
      D) 0 to 40 wt. % of an adhesion-promoting monomer, wherein A) to D) constitute 100 wt. % of the polymerisable constituents, II. 5 to 400 parts by weight of plasticisers compatible with component I per 100 parts by weight of component I and III. 0 to 700 parts by weight of inorganic fillers per 100 parts by weight of component I; wherein component I has a bimodal or multimodal primary particle size distribution, and wherein said component I has a weight average molecular weight of >3,000,000 g/mol, comprising mixing components I, II and III to produce said plastisol.

13. Plastisol according to claim 2, wherein the average particle diameter of a first mode of the primary particle size distribution is within the range between 50 and 500 nm, while the average particle diameter of a second mode of the primary particle size distribution is in the range between 600 and 2000 nm.

14. Plastisol according to claim 2, wherein the average particle diameter of a first mode of the primary particle size distribution is within the range between 100 and 250 nm, while the average particle diameter of a second mode of the primary particle size distribution is in the range between 800 and 1200 nm.

15. Plastisol according to claim 3, wherein component I exhibits a bimodal primary particle size distribution.

16. Plastisol according to claim 4, wherein component I exhibits a bimodal primary particle size distribution.

17. Plastisol according to claim 13, wherein component I exhibits a bimodal primary particle size distribution.

18. Plastisol according to claim 14, wherein component I exhibits a bimodal primary particle size distribution.

* * * * *